United States Patent [19]

Verduin

[11] Patent Number: 5,064,661

[45] Date of Patent: Nov. 12, 1991

[54] PROCESS FOR MAKING LOW SODIUM SPONGE GOODS AND PRODUCTS OBTAINED THEREBY

[75] Inventor: Patricia Verduin, Glen Rock, N.J.

[73] Assignee: Nabisco Brands, Inc., Parsippany, N.J.

[21] Appl. No.: 302,754

[22] Filed: Jan. 27, 1989

[51] Int. Cl.$^5$ .............................................. A21D 2/02
[52] U.S. Cl. ...................................... 426/26; 426/19; 426/20; 426/62
[58] Field of Search ....................... 426/19, 20, 27, 62

[56] References Cited

U.S. PATENT DOCUMENTS 3,297,449  1/1967  Baker et al. ........................ 426/551

FOREIGN PATENT DOCUMENTS 0286723  10/1988  European Pat. Off. .............. 426/20

Primary Examiner—Joseph Golian

[57] ABSTRACT

Low sodium sponge goods, such as soda crackers, oyster crackers, pretzels, and flavored snack crackers, having a substantially uniform texture and pH throughout, a substantially uniform surface color, a pleasant mouth feel and taste are obtained by replacing at least a part, preferably all, of the sodium bicarbonate conventionally used for leavening with potassium carbonate and potassium bicarbonate, the molar ratio of potassium carbonate to potassium bicarbonate being from about 85:15 to about 50:50. The potassium carbonate and potassium bicarbonate are preferably added to the dough as an aqueous solution.

24 Claims, No Drawings

PROCESS FOR MAKING LOW SODIUM SPONGE GOODS AND PRODUCTS OBTAINED THEREBY

BACKGROUND OF THE INVENTION

1. Field Of The Invention

This invention relates to the production of sponge goods, especially crackers, having a low sodium content.

2. Description Of The Prior Art

As described in the U.S. Ser. No. 584,868 filed Feb. 29, 1984, now abandoned, in the production of sponge goods, such as soda crackers, sodium bicarbonate serves a dual function of: 1) neutralizing the acids produced by fermentation in production of the sponge and, 2) leavening the sponge-good dough prior to and during baking. The yeast-leavened sponge contains a considerable amount of acid which is developed by the yeast and by bacteria during fermentation. Sponge formation is followed by production of the sponge-good dough. Conventionally, the acid in the sponge is neutralized by adding sodium bicarbonate when the dough is mixed.

Conventional processes for the production of soda crackers are disclosed in U.S. Pat. Nos. 1,803,588 and 2,288,118 and in Johnson et al, *Encyclopedia of Food Technology*, The AVI Publishing Company, Inc., Westport, Conn., Vol. 2, pages 113–114 (1974), by Matz, Samuel in *Cereal Technology*, The AVI Publishing Company, Inc., Westport, Conn., pages 80–82 (1970), and by Matz, *Cookie and Cracker Technology*, The AVI Publishing Company, Inc., Westport, Conn., pages 137–142 (1968). A soda cracker produced by this method typically contains about 194 mg total sodium per 14.2 gm serving. About 20 to 25% of this total sodium is due to the use of sodium bicarbonate. Medically, it is considered essential that persons suffering from vascular diseases, coronary diseases, and liver diseases, be restricted to a low sodium diet.

Many compositions have been developed as a replacement for common table salt, or sodium chloride, for use in low sodium diets. Salt substitute compositions are disclosed in U.S. Pat. No. Re. 27,981; U.S. Pat. Nos. 2,601,112; 2,824,008; and 3,505,082. In the compositions of these patents, potassium chloride is used as a replacement for sodium chloride. Other ingredients are added to mask the bitter taste of the potassium ion and to minimize caking and dusting. The beneficial effect of including potassium in the diet is taught in U.S. Pat. No. 4,216,237 and in Russian patent 257,399. In U.S. Pat. No. 4,216,237 the bitter taste of the potassium ion is masked with a water-soluble, carbohydrate foodstuff ingredient. Potassium chloride, it is disclosed, is prone to ulcerate the intestinal tract, in addition to being unpalatable. Substantially equal portions of bicarbonate, citrate, and diphosphate are used to achieve a better balance of anions more closely related to natural potassium sources. Approximately ¼ to ½ of the potassium salt ingredient is comprised by the chloride. In Soviet patent 257,399, potassium chloride is used in a two-to-one ratio with lithium chloride to improve the curing properties of dietetic bread or rolls. The taste of the products, it is disclosed, is the same as with sodium chloride and the harmful effects of sodium chloride are avoided. While replacement of sodium chloride with potassium chloride can be beneficial to the health, as indicated in these patents, it would not serve the function of neutralizing the acids produced in forming a sponge, and it would not leaven the sponge-good dough. Additionally, sodium chloride contributes flavor to a cracker or other sponge good. In producing a low sodium sponge good, it would be desirable to eliminate other sources of sodium to enable retention of some sodium chloride for its flavoring characteristics.

While sodium bicarbonate is the most widely used chemical leavening agent, many other compositions for producing carbon dioxide gas in foods without the use of sodium bicarbonate are known. Baking powder compositions which contain ammonium carbonate or ammonium bicarbonate are disclosed in U.S. Pat. Nos. 150,844; 174,890; 235,615; and 1,865,938. The carbonate of barium is considered to be poisonous in U.S. Pat. Nos. 331,541 and 331,542. The carbonates of calcium, magnesium and strontium are used in the baking powder compositions of the latter two patents. The carbonates of calcium are also utilized in the baking powders of U.S. Pat. Nos. 150,844 and 328,364. The carbonates of magnesium are present in the baking powders of U.S. Pat. Nos. 315,830; 315,831; 315,832; and 328,364. The carbonate or bicarbonate of potassium is present in the baking powder compositions of U.S. Pat. No. Re. 2,597, U.S. Pat. No. Re. 2,979, and U.S. Pat. Nos. 14,722; 96,994; 150,844; 174,890; 235,615; and 673,057. According to U.S. Pat. No. 235,615, the bicarbonate is preferred over the carbonate for raising bread because less lactate is required to react with the bicarbonate. In U.S. Pat. No. 422,464, it is taught that ammonium carbonate is used to prevent a baking soda comprising cream of tartar and sodium bicarbonate from becoming hard. However, according to U.S. Pat. No. 422,464, the carbonate of ammonium is considered to be objectionable as a food.

Effervescing salt compositions which utilize carbonates for producing carbon dioxide are disclosed in U.S. Pat. Nos. 1,450,865 and 2,984,543. The carbonates or bicarbonates of sodium, potassium, ammonium, calcium or magnesium may be used in the compositions of U.S. Pat. No. 1,450,865. In U.S. Pat. No. 2,984,543, the effervescing salt may contain potassium or lithium bicarbonates or calcium, magnesium, or organic carbonates. However, in these effervescing salt compositions and in the baking powder compositions, an acid is included for reaction with the bicarbonate or carbonate for producing the carbon dioxide. These compositions would be unsuitable for use in producing a sponge-good dough because they would not serve the dual function of leavening the sponge-good dough and neutralizing the acids which are produced during formation of the sponge.

The addition of an alkaline carbonate as a neutralizer and as a leavening agent for a "prepared flour" is taught in U.S. Pat. No. 1,428,628. Lactic acid which is present in sour milk or butter milk of the prepared flour is neutralized by the alkaline carbonate. Bicarbonate of soda, however, is the only carbonate disclosed in the patent.

The use of carbonates, other than sodium bicarbonate in the production of baked goods is disclosed in British patent Nos. 1,085 of 1883 and 335,214, U.S. Pat. No. 2,970,915 and as early as 1796 in *American Cookery*, by Amelia Simmons, reprint by Martin Rywell, Buck Hill Associates, Johnsburg, N.Y. 12843, pps. 30–31 (1966). The addition of iron and manganese carbonates to bread and biscuits for medicinal purposes is disclosed in British patent No. 1,085 of 1883. Magnesium and/or calcium carbonates are taught as acid-neutralizing constituents in British patent 335,214 for dough or flour compositions which contain persulphates and bromates.

Calcium carbonate is disclosed as a bread improver in U.S. Pat. No. 2,970,915. In *American Cookery*, recipes for honey cake and cookies include pearl ash, an impure potassium carbonate product obtained by partial purification of potash from wood ashes. Replacement of sodium bicarbonate with potassium carbonate to achieve sodium reduction in the final baked product is not taught by any of these references.

The preparation of a health bread with potassium carbonate and ammonium carbonate as a leavening agent is taught in U.S. Pat. No. 2,228,729. The potassium carbonate, it is disclosed, results in a bread which is free of greenish color or hue and possesses a fine whitish interior. The ammonium and potassium carbonates are added to a sponge which contains approximately 40% or more eggs. The large percentage of eggs, it is disclosed, creates a large expanding force upon heating thereby reducing the usual amount of chemical leavening agents needed for expansion. Although a sponge is produced, fermentation is not disclosed in the patent. Additionally, the degree of expansion needed in the production of the bread would be unacceptable in the production of crackers.

The use of alkaline carbonates, other than those of sodium, as a leavening agent or neutralizing agent in the production of baked goods, is also disclosed in U.S. Pat. Nos. 317,821; 1,913,044; 2,070,922; and 2,394,791, and in *Food Materials & Equipment*, page 18, (March 1946). Treating a sponge to neutralize its acidity, to leaven it and to obtain a low-sodium cracker is not disclosed in these references. In U.S. Pat. No. 317,821, the acid or disulfate of potash with carbonates or bicarbonates of potash is used as a replacement for tartaric acid in the production of bread, cakes, biscuits, and the like. In U.S. Pat. No. 1,913,044, a bicarbonate or carbonate of either sodium or potassium is reacted with manganese succinate to promote oxidation of the coloring matter in a bread dough. Calcium carbonate is taught as a replacement for sodium bicarbonate in the pastry industry in the *Food Materials & Equipment* article. In U.S. Pat. No. 2,070,922, hydrogen peroxide is used as a leavening agent in the production of waffles, griddle cakes, crackers, and the like. Alkaline metal carbonates are used to stabilize the hydrogen peroxide and to make the formulation alkaline at a pH of about 8 to 10. Pre-neutralization of starch for various wafer or waffle batters with calcium carbonate is taught in U.S. Pat. 2,394,791. The calcium carbonate replaces a portion of the sodium bicarbonate, the sodium bicarbonate being retained to obtain sufficient leavening action.

Treatment of a fermented dough with a carbonate other than sodium is disclosed in U.S. Pat. No. 2,032,442. In the process of this patent, a heat-decomposable ammonium compound, such as a carbonate of ammonium, is applied to the surface of a fermented dough. Subsequent baking releases ammonia which browns the surface of the bread, rolls, and like products. Mixing of the ammonium carbonate with the fermented dough to distribute it substantially uniformly throughout the dough to achieve neutralization of acids produced during fermentation is not disclosed.

Baker, U.S. Pat. No. 3,297,449 describes improvements in packaged dough compositions and especially those kept under refrigeration prior to use. The doughs disclosed in Baker are not sponge goods and do not undergo a fermentation step. Rather, the doughs in Baker contain a chemical leavening system composed of one or more leavening acids and an alkaline substance capable of releasing carbon dioxide upon reaction with the leavening acid. Baker discloses that sodium acid pyrophosphate has been found to be especially well suited to function as the leavening acid in such chemical leavening systems. Accordingly, Baker continues, so far as leavening of the dough is concerned, the system of sodium acid pyrophosphate and baking soda (sodium bicarbonate) is eminently satisfactory. However, according to Baker, this combination of sodium acid pyrophosphate and sodium bicarbonate has the severe disadvantage that, during storage over a long period, these components tend to react together to form disodium orthophosphate dodecahydrate, which deposits in the dough in the form of glassy monoclinic crystals which resemble broken glass, thereby leading many housewives to fear that the dough is contaminated. Baker teaches that the formation of crystals of disodium orthophosphate dodecahydrate in the dough can be reduced by substituting potassium for sodium in the dough by using potassium bicarbonate, or less desirably potassium carbonate, in place of the sodium bicarbonate in the leavening agent. Thus, the teaching of Baker is that, in a chemically leavened dough in which the leavening agent comprises sodium acid pyrophosphate and sodium bicarbonate, the tendency for objectionable crystals to be formed in the dough can be reduced by replacing part of all of the sodium bicarbonate with potassium carbonate. The avoidance of crystals of disodium orthophosphate dodecahydrate is only purpose for which Baker teaches replacement of sodium bicarbonate with potassium bicarbonate, or less desirably potassium carbonate.

U.S. Pat. No. 4,379,174 to Umina discloses a method of controlling leavening in a bakery mix to be used at various elevations comprising packaging all but one of the ingredients (preferably sodium bicarbonate) which produce leavening in a separate package from that containing the remaining ingredients of the baking mix, the package containing this one ingredient being provided with indicia at various levels to indicate the proper amount of sodium bicarbonate or other leavening ingredient for a selected elevation to be added to the remaining ingredients of the baking mix. The passage at column 3, lines 55–59 of this patent, states that "the component of the bakery mix which is isolated from other components of the bakery mix may be other potential gas-liberating materials, such as other edible carbonates or bicarbonates, e.g., ammonium bicarbonate"; there is no mention of potassium, much less of potassium carbonate or bicarbonate in this passage.

The use of alkaline carbonates, other than sodium bicarbonate, in fermented doughs for the production of various baked goods, is disclosed in U.S. Pat. Nos. 2,033,099; 2,137,027; 3,108,878; and 4,044,155. In the processes of these patents the alkaline carbonate is added with the yeast and is present during fermentation. Breads, rolls, buns, and the like are produced from these yeast leavened doughs. The production of soda crackers is not disclosed. In U.S. Pat. No. 2,033,009, an alkaline salt is added to the yeast food to keep it alkaline until it reaches the fermentation stage, whether in the dough or in the sponge. Calcium carbonate or magnesium carbonate are disclosed as the preferred alkaline salts because of their slow solubility. In U.S. Pat. No. 2,137,027, a yeast sponge is buffered with ammonium carbonate or calcium or magnesium carbonates. In U.S. Pat. No. 3,108,878, a calcium carbonate buffer is added with yeast to a soy flour dough composition. In U.S.

Pat. No. 4,044,155, a non-fat dry milk substitute for incorporation into yeast-leavened doughs, is prepared by mixing deproteinized whey, an ammonium compound such as ammonium carbonate or bicarbonate, and a protein supplement. A basic material, such as a carbonate or bicarbonate of sodium, potassium, calcium, or magnesium, is optionally added to control the pH of the substitute and to at least partially neutralize the deproteinized whey.

Calcium carbonate is taught as a buffering agent for a liquid yeast brew in U.S. Pat. No. 3,490,916. The brew may be used to form a yeast leavened dough, which may be a cracker or soda cracker composition. The use of calcium carbonate to neutralize the acids present in a sponge and to leaven the fermented dough is not disclosed. Furthermore, calcium carbonate is not sufficiently soluble in water to uniformly neutralize the acids in a sponge or to leaven a sponge dough substantially uniformly.

U.S. Pat. No. 1,633,872 discloses ammonium bicarbonate as a substitute for baking soda in the production of an unsalted cracker. The use of ammonium bicarbonate instead of sodium bicarbonate as the means of raising the dough, it is disclosed, eliminates the soda flavor and improves the color of the cracker. A relatively rapid fermentation time of four to five hours is used before the ammonium bicarbonate is added to the sponge dough. Adding sufficient ammonium bicarbonate to neutralize acids produced during the fermentation is not disclosed. According to U.S. Pat. No. 1,633,872, if too large a proportion of ammonium bicarbonate is used, a yellow objectionable color develops in the cracker.

In using ammonium bicarbonate alone as a replacement for sodium bicarbonate, neutralization of acids produced during fermentation becomes a problem. As disclosed in U.S. Pat. No. 1,633,872, the ammonium bicarbonate is entirely volatilized in the baking operation. The release of both ammonia and carbon dioxide makes pH control of the final product difficult. Furthermore, it has been found that replacement of sodium bicarbonate with ammonium bicarbonate in the production of a soda cracker, does not result in a uniform laminar cell structure. Large cells and tight areas are obtained with ammonium bicarbonate. The cracker is too tender and has both flat and raised or bubbled portions. Accordingly, ammonium bicarbonate alone is not a suitable replacement for sodium bicarbonate in the production of an acceptable low sodium soda cracker.

Potassium bicarbonate has been used as a component in leavening mixtures for baked products intended to be consumed in sodium-free diets. However, as disclosed by Matz in *Cookie and Cracker Technology* (1968) at page 77, potassium bicarbonate is very hygroscopic and tends to impart a bitter flavor to the foods in which it is used. Crackers are baked to a low moisture content and their crispness gives a snap or crunch upon eating. The presence of a highly hygroscopic material in a cracker would tend to be deleterious to the achievement of these sensory properties. Additionally, potassium bicarbonate is expensive. Matz teaches away from the use of carbonates because their very high alkalinity, compared to the alkalinity of sodium bicarbonate, tends to result in localized areas of very high alkalinity which is formed as the granules dissolve in the dough. These localized areas, it is disclosed, result in reactions which lead to undesirably colored and flavored products. In producing a laminated product, these localized areas generally appear as dark streaks in the baked product.

The present invention provides a process for the production of sponge goods, especially crackers, having a crisp texture, a non-bitter taste, a pleasant mouth feel and a substantially uniform laminar cell structure without using sodium bicarbonate. Thus, substantial sodium reduction can be achieved while retaining sodium chloride for its flavoring characteristics. The baked products have a uniform brown color on their surfaces, are of substantially uniform pH throughout, and are devoid of hot-spots or dark streaks caused by localized areas of carbonate leavening agents.

Food Science Technology Abstracts, 1980, No. 719 584, V. A. Patt et al., "Process for preparing wheat samples for breadmaking", describes a process for making bread containing flour, water and an alkali metal carbonate, which can be potassium carbonate. Brot und Gebaeck, 18th Year 1964, Book 3, pages 41-48, describes a process in which potassium carbonate is used in the production of a "Dutch breakfast cake". Neither of these documents describes the use of potassium carbonate as a leavening agent to produce sponge goods having a pH within the range produced by the method of this invention.

Under current Food and Drug Administration proposals, a "low sodium" baked good, which includes sponge goods, unfermented type crackers, cookies and cakes, has a sodium content of from 35 to 140 mg. $Na^+$ per serving, while a "very low sodium" baked good has a sodium content of less than or equal to 35 mg. $Na^+$ per serving. Also, a "no-sodium" baked good has a sodium content of less than or equal to 5 mg. $Na^+$ per serving. According to FDA proposed rules, products which contain not more than 20% in excess of the value stated for sodium declared in the label are considered to be properly labeled. "Very low-sodium" products and "no-sodium" products may accordingly contain up to 42 mg. per serving and up to 6 mg. per serving, respectively. The weight of a "serving" depends upon the type of baked good. As used herein, a serving is 14.2 g. (½ oz.) for crackers of the fermented and unfermented-types, and 28.35 g. (1 oz.) for cookies and pretzels. The present invention provides a process for reducing the sodium content of sponge goods to a "low sodium", "very low sodium" or "no sodium" level as defined above for each type of sponge good. The sodium content is based upon the final baked product (i.e., the serving) and includes sodium from topping salt (sodium chloride) as well as from salt within the final product.

The aforementioned copending application Ser. No. 584,868 discloses replacement of the sodium bicarbonate in sponge-good doughs with potassium carbonate, the amount of potassium carbonate used being sufficient to obtain a pH in the baked cracker of from about 7.0 to about 8.0.

Application Ser. No. 773,127, filed Sept. 6, 1985 abandoned in favor of U.S. Ser. No. Oct. 6, 1987 now U.S. Pat. No. 4,859,473 as a continuation-in-part of the aforementioned copending application Ser. No. 584,868 filed Feb. 29, 1984, now abandoned, discloses a leavening composition for chemically leavening baked goods, the leavening composition comprising from about 40 to about 80 percent by weight of ammonium bicarbonate, from about 30 to about 10 percent by weight of potassium carbonate, and from about 30 to about 10 cent by weight of an edible acidic component capable of reacting with the potassium carbonate to liberate dioxide, the percentages being based upon the weight of the bicarbonate, potassium carbonate and the acidic component on an anhydrous basis.

The aforementioned application Ser. No. 773,127 also states that the choice of a leavening system for a low-sodium unfermented cracker, or other unfermented or chemically leavened baked goods, involves consideration of a number of properties desired in the final cracker, including sodium content, oven spring, browning (the production of a brown color in the baked cracker), and the pH of the baked cracker. Of the acidic components available for use in chemical leavening systems, calcium phosphate monobasic is usually preferred since it not only acts as the acidic component of the leavening system but also promotes browning of the cracker. Increasing the proportion of ammonium bicarbonate in the leavening system increases oven spring, as already noted, but may affect the pH, and hence the taste, of the final product, since ammonium bicarbonate is less alkaline than potassium carbonate. Potassium carbonate tends to produce less oven spring than ammonium bicarbonate, but its more alkaline character is useful in increasing the pH of the final cracker to within the desired range.

As mentioned above, the aforementioned application Serial No. 584,868 filed Feb. 29, 1984, now abandoned teaches that sponge goods having reduced sodium contents can be prepared by replacing part or all of the sodium bicarbonate, conventionally used in the dough-up stage of the process for preparing sponge goods, with potassium carbonate. However, it has been found that, if potassium carbonate alone is used to replace the conventional sodium bicarbonate, difficulties are encountered if the lay time of the dough-up stage (the period from the time at which the dough ingredients are mixed to the time at which the finished dough is laminated and baked) becomes protracted, as may happen, for example, in commercial production where mechanical faults in the machinery used for lamination, baking and packing may require the processing of a batch of formed dough to be delayed. More specifically, it has been found that, if a dough containing only potassium carbonate is allowed to stand for an extended period, the pH of the dough tends to vary, and this variation in pH of the dough affects both the oven spring and the taste of the final cracker.

It has now been found that the problems encountered when using potassium carbonate as the leavening agent in sponge goods can be reduced or eliminated is the potassium carbonate is used in admixture with potassium bicarbonate.

SUMMARY OF THE INVENTION

Accordingly, the present invention provides a method for making a sponge good comprising:

a. preparing a sponge by a process comprising mixing sponge ingredients comprising flour, water, and yeast and fermenting the mixture;

b. forming a dough by a process comprising admixing the sponge with dough ingredients comprising flour and an alkaline leavening agent so as to form a sponge-good dough, the alkaline leavening agent added serving to control the pH of the dough by neutralizing acids produced during the fermentation and to leaven the dough, the alkaline leavening agent comprising potassium carbonate and potassium bicarbonate, the molar ratio of potassium carbonate to potassium bicarbonate in the alkaline leavening agent being in the range of from about 85:15 to about 50:50; and c. baking the dough, the amounts of potassium carbonate and potassium bicarbonate included in the dough being sufficient to obtain a pH of from about 7.0 to about 8.0 in the baked sponge good.

The present invention also provides a method for the production of a laminated sponge good comprising: a) preparing a sponge, by a process comprising mixing sponge ingredients comprising flour, water and yeast and fermenting the mixture; b) forming a dough by a process comprising admixing dough ingredients comprising flour, sodium bicarbonate, and at least one of water and shortening with said sponge, thereby forming a dough; c) laminating the dough; and d) baking the laminated dough. In the process of the present invention at least a portion of the sodium bicarbonate is replaced with potassium carbonate and potassium bicarbonate, the molar ratio of potassium carbonate to potassium bicarbonate being in the range of from about 85:15 to about 50:50, and the replacement being effected to an extent such that substantially all of the sodium of the laminated sponge good is contributed by sodium chloride.

The present invention also provides a dough composition for producing a cracker, the dough composition comprising flour, water, fat or shortening, potassium carbonate and potassium bicarbonate, the molar ratio of potassium carbonate to potassium bicarbonate in the dough composition being in the range of from about 85:15 to about 50:50.

Finally, the present invention also provides a cracker baked from a dough composition comprising flour, water, fat or shortening, potassium carbonate, potassium bicarbonate, and sodium chloride, the cracker having sodium chloride present as a topping on one of its surfaces, at least about 85 percent by weight of the sodium in the cracker, including the topping, being present as sodium chloride.

References to weight percentages and molar ratios of the components of the leavening compositions of the present invention are calculated on an a molar weight basis i.e. with the weights of all components calculated in their anhydrous forms, ignoring any water of crystallization which may be present. The components need not actually be present in their anhydrous forms; for example the ammonium bicarbonate is conveniently used in the form of its monohydrate.

DETAILED DESCRIPTION OF THE INVENTION

The present invention relates to a process for the production of sponge goods, such as soda crackers, without using sodium bicarbonate. By eliminating a substantial portion (preferably all) of the sodium bicarbonate, a larger amount of sodium chloride can be retained for the flavor or the "bite" which is characteristic of salt while achieving a lower sodium content. Reduction of the sodium chloride level and the sodium bicarbonate level can achieve a sodium content of, for example: a) less than or equal to 42 mg., preferably less than or equal to 35 mg., per 14.2 gm serving for "very low sodium products", or b) less than or equal to 6 mg., preferably less than or equal to 5 mg., per 14.2 gm serving for "no-sodium" products. Potassium carbonate and potassium bicarbonate, instead of sodium bicarbonate, are used to neutralize the acids resulting from fermentation in the production of the sponge-good dough and to leaven this dough. Amounts of potassium carbonate and potassium bicarbonate are used which are sufficient to achieve a desired pH, in the range of about 6.6 to about 8.0, in the final product; in the case of soda crackers, the pH of the final product is preferably from about 6.8 to about 7.8. A substantially uniform pH throughout the final product and the substantial elimination of hot-spots or dark streaks caused by localized areas of potassium carbonate and potassium bicarbonate can be achieved by: 1) distributing at least one of the potassium carbonate and the potassium bicarbonate substantially uniformly and directly on the surface of the other ingredients to hydrate and solubilize substantially all of the potassium carbonate and/or the potassium bicarbonate); or 2) by use of an aqueous solution of at least one of the potassium carbonate and the potassium bicarbonate, the latter being the preferred technique. Substantial avoidance of hot spots can also be achieved by adding flour to the sponge and then distributing at least one of the potassium carbonate and the potassium bicarbonate, having a fine particle size, substantially uniformly over the flour.

Sponge goods produced by the method of the present invention have a crisp texture, a non-bitter taste, uniform brown color on their surfaces, and a substantially uniform laminar cell structure which are characteristic of similar crackers conventionally produced using sodium bicarbonate. The products have a pleasant mouth feel.

Conventional formulations can be used for the production of sponge goods according to the process of the present invention except that the sodium bicarbonate is replaced with potassium carbonate and potassium bicarbonate. Replacing all of the sodium bicarbonate with potassium carbonate and potassium bicarbonate allows for substantially all of the sodium content to be from sodium chloride. The sodium chloride contributes to flavor enhancement and the elimination of a bland taste to a much greater extent than does sodium bicarbonate. Thus, by using potassium carbonate and potassium bicarbonate to replace sodium bicarbonate in sponge goods in accordance with the present invention, one can increase the proportion of sodium in the baked good which is present in the form of sodium chloride. This is especially advantageous in crackers, in which a salty taste is desired since it enables one to achieve a given degree of salty taste at a lower sodium content, or a greater degree of salty taste at a given sodium chloride content. In a conventional soda cracker in which sodium bicarbonate is used as part of the leavening agent, the sodium bicarbonate will supply about 25 percent of the sodium in the baked cracker. Thus, at most, only about 75 percent of the sodium in the baked cracker is in the form of sodium chloride, whereas by replacing part or all of the sodium bicarbonate with potassium carbonate and potassium bicarbonate in accordance with the present invention one can achieve crackers in which at least 85 percent, and in most cases at least 90 or 95 percent of the sodium in the cracker is in the form of sodium chloride. Total replacement of sodium bicarbonate with potassium carbonate and potassium bicarbonate can yield crackers in which the only substantial source of sodium is sodium chloride. For example, the preferred cracker of the invention described in the Example below contains 115 mg. of sodium ion per serving, of which about 110 mg. (about 95 percent) is in the form of sodium chloride, the small remaining amount of sodium being in the form of unavoidable sodium in the flour and other dough ingredients. Desirably, soda crackers produced by the process of the present invention have a sodium content not greater than about 130 mg. of sodium ion per 14.2 g. serving.

In the preparation of sponge crackers, a sponge is first formed from flour and water. The fermentation agents are yeast and bacteria. The surfaces of the trough in which the sponge is formed can serve as sources of the bacteria. It is preferable to use a starter or inoculum from a previous batch of sponge to serve as a source of yeast and bacteria. A sponge flour is typically relatively strong, unbleached, with an ash of 0.39 to 0.42%. It typically has a protein content of about 7.5 to 13.0% and an acid viscosity value in the range of about 60° to 90° M. A typical sponge is produced by combining the flour, water, yeast, and optional inoculum in a mixer, such as a spindle mixer. During fermentation, starch is converted to dextrins and fermentable sugars by amylases. Deficiencies in flour amylase can be corrected by the addition of diastatically active malt flour, such as malted barley flour, and/or a fungal diastase.

Shortening which can be lard or vegetable shortening, for example, is preferably added to the sponge during the dough-mixing stage. It is also preferable to add all of the water (except for any water reserved to form an aqueous solution of potassium carbonate and potassium bicarbonate) in the sponge-forming stage to avoid an extra step in the dough-forming stage.

In the production of the sponge, a buffering system may be used to compensate for water supplies which have very high pH's. Commercially available buffering systems for this purpose or commercially available yeast foods which contain buffering systems can be used.

Typical relative amounts of the ingredients used in the formation of the sponge are from about 60 to about 70% by weight wheat flour, from about 27% to about 33% by weight water, from about 0.1 to about 1% by weight yeast, from 0 to 1% by weight diastatic malt or proteolytic enzyme, from about 0 to about 7% shortening, from about 0 to about 1% by weight yeast food, and from about 0 to about 2% by weight of starter or ferment. All percentages are based upon the total weight of the ingredients used to form the sponge.

Fermentation times (also referred to herein as sponge times) are those conventionally used in the art. In the case of soda crackers or saltines, and the many variants of these products such as oyster (soup) crackers, club crackers, cheese crackers, and the like, sponge times of about 2 to 24 hours are typically used. The process of the present invention can also be used in the production of sponge goods requiring shorter fermentation times or longer fermentation by replacing the sodium bicarbonate which is added in the dough-up step with potassium carbonate and potassium bicarbonate.

In preparing the sponge, no special order of mixing is required. Conventional processes can be used. Typically, the flour is dumped into a trough, a portion of the water containing dissolved yeast is added, the remaining ingredients of the sponge are added, and then the balance of water is added. The sponge ingredients are mixed until clear to obtain substantial homogeneity. The setting temperature for the sponge is usually about 75° F. but varies from about 70° to about 80° F. depending upon several factors, chiefly the flour.

Typical dough ingredients for mixing into the fermented sponge include flour, shortening, potassium carbonate and potassium bicarbonate. The addition of a minor amount of water or calcium carbonate in the dough-up stage is optional. The calcium carbonate is added for the nutritive value of the calcium. Normally, some calcium chloride is added to the dough to produce the desired salty taste in the product. Ammonium bicarbonate can be added to the dough to provide additional oven spring if necessary, though the use of ammonium bicarbonate is usually not necessary in the process of the present invention.

A minor amount of water can be used to achieve lubricity, particularly when a portion of the total amount of shortening in the biscuit formulation is used as an ingredient in making the sponge. However, it is preferable to include all of the water as an ingredient of the sponge and all of the shortening as an ingredient of the dough.

The dough flour should be weaker than the sponge flour, typically with an ash of about 0.40%, a protein content of about 8 to 9 %, and an acid viscosity reading of about 55° to 60° M. Wheat flour is preferred.

The potassium carbonate and potassium bicarbonate which are used in the present invention may be any food-grade form of these compounds, anhydrous or hydrated. The potassium carbonate and potassium bicarbonate may be added either in dry form or as one or two aqueous solutions. A portion of the water used in making the sponge or dough can be used to form the solution(s). A commercially available aqueous potassium carbonate solution, such as a 47% by weight potassium carbonate solution sold by Diamond Shamrock Chemicals Company, Morristown, N.J. can also be used. The amount of water added to the sponge or dough may correspondingly be reduced.

Suitable amounts of the dough ingredients, based upon the total weight of the dough ingredients which are added to the sponge, are from about 65% to about 80% by weight of flour, from about 14% to about 29% by weight shortening, from 0.5% to 2.5% by weight potassium carbonate, from 0.15 to 1.25% by weight potassium bicarbonate, from 0 to 0.5% ammonium bicarbonate, from about 0 to about 10% by weight calcium carbonate, from about 0 to about 1.2% by weight salt as sodium chloride, and from about 0 to about 5% by weight water.

The relative amounts of the total amount of sponge ingredients to the dough ingredients should be such that the weight percent of flour used to form the sponge is from about 60% to about 75% by weight of the total amount of flour which is used. Instead of including the optional salt in the dough-up stage, this salt or a portion of this salt, can be used as topping salt. The ultimate amount of salt which is used is governed by the desired serving limitation on sodium e.g., 35 mg or less sodium per serving. Additionally, the amounts of potassium carbonate and potassium bicarbonate which are used are governed by the amount of acid produced during the fermentation stage. The above ranges of from 0.5% to 2.5% by weight potassium carbonate and from 0.15 to 1.25% by weight potassium bicarbonate, however, have been found to be generally suitable for obtaining the desired pH range of about 6.7 to about 8.0, and desirably 7.0 to 8.0, in the sponge goods. The precise amount needed to obtain a desired final pH can be determined by the same techniques used to determine the amount of sodium bicarbonate addition. The acidity in the sponge which must be compensated for by addition of the potassium carbonate and potassium bicarbonate is related in a general way to pH, and the pH readings on the dough can be used for determining the amounts of potassium carbonate and potassium bicarbonate addition. In the pH test, measurements with temperature compensated electrodes can be taken directly on the sponges immediately prior to addition of the dough ingredients, as is known in the art. Additionally, pH tests on lumps of dough or sponge sent through the oven ahead of the batch can be used to compensate for changes which may take place in the oven. A total titratable acidity measurement on the sponge is a preferred method because it has been found to be more accurate, even though more time-consuming, than the pH test. A fast, accurate method particularly suitable for monitoring production runs is to crush the baked, final product, distribute it in distilled water to form a 10% by weight slurry, and to make adjustments in the potassium carbonate and potassium bicarbonate levels based upon the pH of the slurry.

Suitable specific sponge and dough formulations for soda crackers or sprayed crackers which can be modified in accordance with the present invention are disclosed in Matz, S., *Cereal Technology*, the AVI Publishing Company, Inc., Westport, Conn., page 138, Table 38 and page 143, Table 39 (1968) and in Johnson et al., *Encyclopedia of Food Technology*, the AVI Publishing Company, Inc., Westport, Conn., page 114, Table B7 (1974). In these formulations, in accordance with the process of the present invention, the sodium bicarbonate is replaced with potassium carbonate and potassium bicarbonate and the salt content is reduced so as to achieve a pH in the range of about 6.7 to 8.0, and desirably 7.0 to 8.0, and a sodium content of, for example, less than or equal to 35 mg per 14.2 gram serving.

The dough ingredients are combined with the sponge so as to avoid occurrence of hot spots due to local concentrations of the potassium carbonate and/or potassium bicarbonate. Conventionally, the flour, typically of medium and/or low strength, is first added to the surface of the sponge and then the sodium bicarbonate is added on top of the flour. This same procedure can be used for the addition of potassium carbonate (and preferably the potassium bicarbonate) provided that: a) the potassium carbonate (and preferably the potassium bicarbonate) is added as an aqueous solution, or b) the particle size of the potassium carbonate (and preferably the potassium bicarbonate) is comparable to the particle size of powdered sodium bicarbonate conventionally used for baking. Suitably, potassium carbonate and potassium bicarbonate having a sieve analysis of "100 mesh 2% by weight retained, 200 mesh 15%–45% by weight retained, 325 mesh 50% by weight minimum retained" or finer can be used. To further assure the avoidance of hot spots, the flour should be distributed substantially uniformly over the surface of the sponge and the potassium carbonate (and preferably the potassium bicarbonate), either dry or as an aqueous solution, should be distributed substantially uniformly over the flour. Coarser potassium carbonate and potassium bicarbonate, as well as fine potassium carbonate and potassium bicarbonate, can be used by applying the potassium carbonate (and preferably the potassium bicarbonate) directly and substantially uniformly on the surface of the sponge so that the surface moisture of the sponge hydrates and solubilizes substantially all of the potassium carbonate and/or potassium bicarbonate. In this embodiment, potassium carbonate and potassium bicarbonate having particle sizes ranging up to about "through 20 mesh, on 80 mesh 98% by weight" can be used, for example, with substantial elimination of hot spots which are due to localized areas of excessive alkalinity.

In the method of the present invention, the potassium carbonate and potassium bicarbonate may, if desired, be added to the dough in two separate operations, and the two compounds need not be added in the same form; for example one compound could be added in the form of a dry powder, while the other is added in the form of an aqueous solution. However, in general it is convenient to add both compounds in a single operation. Furthermore, since the molar ratio of potassium carbonate to potassium bicarbonate added to the dough will normally remain constant even though it may be necessary to vary the amounts of each compound in response to changes in the acidity of various batches of sponge, it will generally be found convenient to form a mixture of potassium carbonate and potassium bicarbonate, and then to add this mixture to the dough by any of the techniques previously discussed. The mixture of potassium carbonate and potassium bicarbonate may be in the form of a mixture of the dry compounds or in the form of a mixed aqueous solution. If the dough is also to contain ammonium bicarbonate, the ammonium bicarbonate may also be incorporated into the mixture.

After adding the potassium carbonate and flour to the sponge, the remaining dry ingredients are added, preferably by sieving, followed by partial mixing, and the addition of the shortening and optional water. The dough ingredients and the sponge are then mixed to obtain a dough of substantial homogeneity. After mixing, the dough is proofed, or allowed to ferment, as is conventional in the cracker art. Typical proofing times range from about 3 hours to about 5 hours, most typically about 4 hours. Generally, the temperature of the sponge before doughing, the temperature of the dough after doughing, and the temperature of the dough at the dough forming machine are substantially the same.

As already mentioned, it has been found that, if potassium carbonate alone is used to replace the conventional sodium bicarbonate in sponge-good doughs, difficulties are encountered if the lay time becomes protracted. For example, a typical cracker dough using potassium carbonate alone and having a minimum lay time of 4 hours (i.e., the dough was not ready for lamination, baking etc. with less than a 4 hour lay time) was found to be adversely affected if the lay time exceeded about 4¾-5 hours; if the lay time exceeded about 5 hours, the pH of the dough dropped too low, affecting both the handling properties of the dough and the taste of the final baked cracker. Thus, this typical dough using potassium carbonate alone provided a "window" of only about 45 to 60 minutes within which the dough had to be processed to produce optimum results.

In commercial cracker production, production and proofing of the dough is necessarily a batch-type operation, whereas lamination, baking etc. are continuous operations. It is conventional to produce batches of dough of a size such that they take approximately 12 minutes to pass through the continuous lamination, baking etc. machinery. To ensure that the entire batch of crackers are of uniform, optimum quality, it is essential that the entire 12 minute interval required to process a specific batch of dough fall within the "window" allowed by the permissible variation in lay time of the dough. Thus, in commercial practice the "window" of about 45 to 60 minutes provided by the aforementioned dough using potassium carbonate alone allows only 30 to 45 minutes for delays due to failures in the continuous lamination, baking etc. machinery.

In contrast, the present invention permits one to produce doughs which have a substantially longer "window" than doughs produced using potassium carbonate alone. For example, its has been found that preferred doughs of the present invention having a minimum lay time of 4 hours will tolerate lay times of up to about 7 hours without significant adverse effects on the processing of the dough or the quality of the baked cracker. This maximum 7 hour lay time provides a "window" of approximately 3 hours for processing the dough, and thus allows for interruptions in processing of up to about 2 ¾ hours, thus greatly diminishing the chance of losing a batch of dough because of problems with the continuous machinery.

It should be noted that the improved tolerance of variations in lay time achieved by the process of the present invention is accomplished by the use of a mixture of potassium carbonate and potassium bicarbonate within the specified molar ratios. Mixtures of potassium carbonate and potassium bicarbonate containing less than about 15 molar percent of potassium bicarbonate do not give the significant improvements in lay time achieved by the process of the present invention; for example, it has been found experimentally that a mixture of 90 molar percent of potassium carbonate and 10 molar percent of potassium bicarbonate does not yield a lay time much better than that achieved with potassium carbonate alone. Use of proportions of potassium bicarbonate in excess of about 50 molar percent does not provide any further increase in lay time but does greatly increase the cost of the alkaline leavening agent, since commercially potassium bicarbonate is approximately ten times as expensive as potassium carbonate.

The proofed dough is machined and baked in conventional manner for the preparation of crackers or other sponge goods. Soda crackers, for example, are formed from a continuous sheet of dough which is laminated or lapped before being cut. The dough pieces are formed by a reciprocating cutter or rotary cutter, which does not entirely sever the individual crackers from the sheet. The crackers remain in a substantially continuous sheet through the band oven. The cutter also punctures the dough pieces to form docking holes for the prevention of uneven or excess expansion in the oven. After baking, the individual crackers are separated from the substantially continuous sheet. The optional topping salt is generally applied after stamping and before baking.

Baking is typically performed in a band oven having a mesh band. Baking temperatures and times are those conventionally used in the art. In the case of soda crackers, baking temperatures in a band oven ranging from about 250° F. to about 750° F. for a period of time of about 1.5 minutes to about 2.5 minutes are suitable.

The baked product is typically dried during the baking step to a moisture content of about 2% to about 4% by weight, based upon the final weight of the cracker. A topping oil, such as soyabean oil, can be applied to the surface of the cracker by spraying after baking as is conventional in the art.

The process of the present invention achieves an oven spring, which is the sum of all the leavening that occurs in the oven, with potassium carbonate and potassium bicarbonate which is comparable to the oven spring obtained with sodium bicarbonate.

As noted above, because the present invention allows one to reduce the amount of sodium present in sponge goods in forms other than sodium chloride, the invention permits one to obtain a given degree of salty taste in sponge goods with a lower sodium content than has been possible in prior art sponge goods. Crackers of the present invention, like prior art crackers, may have sodium chloride present in the dough and/or as topping salt applied on one surface of the cracker. The proportions of the total sodium chloride in the dough and the topping affect the taste of the cracker. If all the sodium chloride is present in the dough, it is less effective in giving a salty taste to the cracker than if at least part of the sodium chloride is present in the topping. On the other hand, if all the sodium chloride is present in the topping and none in the dough, a very strong initial salty taste is imparted to the cracker, but this strong initial salty taste may tend to fade to a rather bland taste of the unsalted dough.

In general, it has been found that good results are obtained by using, in fermented crackers, sufficient sodium chloride to provide about 30, and preferably about 40, mg. of sodium ion in the dough, and about 60, preferably about 70, mg. of sodium ion in the topping, per 14.2 g. serving of the baked cracker.

The present invention is further illustrated in the following Example. All percentages, parts, and proportions are by weight and all temperatures are in °F. unless otherwise indicated:

EXAMPLE

This Example illustrates the preparation of a low-sodium fermented cracker by the process of the present invention.

A sponge was prepared from the following ingredients:

| Ingredients | Parts by weight |
| --- | --- |
| Flour | 64.00 |
| Yeast | 0.20 |
| Malt flour | 0.46 |
| Sponge meal | 1.5 |
| Water | 25.0 |
| | 91.16 |

The flour was sieved and dumped into a sponge trough, followed by the malt and the sponge meal. A suspension of the yeast in part of the water was prepared by stirring the yeast and water for at least 10 minutes. The suspension was held at 80° F. (26.7° C.) prior to use.

To prepare the sponge, an appropriate quantity of the solution thus prepared was added to the flour in the trough and the resultant mixture mixed, then covered and allowed to proof for 19 hours.

This sponge was converted into a dough of the present invention by adding the following ingredients:

| Ingredients | Parts by Weight |
| --- | --- |
| Flour | 36.0 |
| Shortening | 8.0 |
| Minor ingredients (salt, malt extract, inactive yeast, calcium carbonate) | 2.42 |
| Potassium bicarbonate | 0.25 |
| Anhydrous potassium carbonate | 0.75 |
| TOTAL | 47.42 |

To prepare the dough from the sponge, the potassium carbonate and potassium bicarbonate were mixed and dissolved in a portion of the water, and then the resultant solution was dispensed on to the sponge. The dough flour was added on top of the sponge. The salt was added, followed by the calcium carbonate, yeast and malt extract. The trough was then placed under the mixer, the blades lowered into the trough, the mixer started, and the shortening added while mixing. After mixing, the resultant dough was proofed for four hours. The proofed dough was then laminated and cut, 1.38 parts by weight of topping salt were applied from a salt spreader and the crackers baked. After baking, spray oil can be applied as a topping.

The resultant batch of crackers of the invention, in which ⅓ of the salt was present as dough salt and ⅔ of topping salt, provided a taste which was found to be substantially the same as control crackers prepared in a similar manner but using sodium bicarbonate, even though the crackers of the invention contained substantially less total sodium, 115 mg. per serving compared to 190 mg. per serving for the conventional crackers. The crackers of the present invention had a substantially uniform pleasant light tan color. Dark streaks, which are evidence of potassium carbonate hot spots were not present. The crackers had a substantially uniform laminar cell structure throughout and a pleasant mouth feel, pleasant crispiness, and no bitter off-flavor.

It was also found that the resultant crackers were not significantly affected by variations of proof (lay) time during the dough stage within the range of about 4 to about 7 hours, whereas similar crackers prepared using only potassium carbonate as the alkaline leavening agent showed significant variations in quality when their proof time exceeded about 5 hours.

What is claimed is:

1. A method for making a low sodium sponge cracker good comprising:
   (a) preparing a sponge by a process comprising mixing sponge ingredients comprising flour, water, and yeast and fermenting the mixture;
   (b) forming a cracker dough by a process comprising admixing the sponge with dough ingredients comprising flour and an alkaline leavening agent so as to form a cracker dough, the alkaline leavening agent added serving to control the pH of the dough by neutralizing acids produced during the fermentation and the leaven the dough, said alakline leavening agent comprising potassium carbonate and potassium bicarbonate, the molar ration of potassium carbonate to potassium bicarbonate in said alkaline leavening agent being in the range of from about 85:15 to about 50:50; and
   (c) baking the dough,
the amounts of potassium carbonate and potassium bicarbonate included in the dough being sufficient to extend the lay time of the dough whereby a pH of from about 6.7 to about 8.0 is obtained in the baked sponge good even after a lay time of at least about 5 hours.

2. A method of according to claim 1 wherein at least one of the potassium carbonate and potassium bicarbonate is added as an aqueous solution.

3. A method according to claim 1 wherein the dough formed in step (b) is laminated before being baked in step (c).

4. A method according to claim 1 wherein the sponge good is a soda cracker.

5. A method according to claim 1 wherein that the ingredients used to prepare the sponge of step (a) comprise from 60% to 70% by weight flour, from 27% to 33% by weight water, 0.1 to 1% by weight yeast, from 0 to 1% 10 by weight diastatic malt, from 0 to 7% by weight shortening, and from 0 to 1% by weight of yeast food, based upon the total weight of the sponge ingredients.

6. A method according to claim 1 wherein the dough ingredients used to form the sponge-good dough of step (b) comprise from 65% to 80% by weight of flour, from 14% to 29% by weight shortening, from 0.5% to 2.5% by weight potassium carbonate, from 0.15 to 1.25% by weight potassium bicarbonate, from 0 to 0.5% ammonium bicarbonate, from 0 to 10% calcium carbonate, from 0 to 1.2% by weight sodium chloride, and from 0 to 5% by weight water, based upon the total weight of the dough ingredients.

7. A method according to claim 1 wherein the molar ratio of potassium carbonate to potassium bicarbonate in said alkaline leavening agent is in the range of from about 85:15 to about 65:35.

8. A method according to claim 4 wherein sodium chloride is incorporated into the dough.

9. A method according to claim 8 wherein the amount of sodium chloride incorporated into the dough is sufficient to provide at least about 30 mg. of sodium ion per 14.2 g. serving of the baked cracker.

10. A method according to claim 4 wherein sodium chloride is added as a topping to the cracker.

11. A method according to claim 10 wherein the amount of sodium chloride applied as a topping is sufficient to provide at least about 60 mg. of sodium ion per 14.2 g. serving of the baked cracker.

12. A method according to claim 1 wherein the total sodium content of the baked cracker is not greater than about 130 mg. of sodium ion per 14.2 g. serving.

13. A method according to claim 12 wherein the cracker comprises at least about 30 mg. of sodium in the form of sodium chloride in the dough, and at least about 60 mg. of sodium in the form of sodium chloride in the topping, per 14.2 g. serving of the baked cracker.

14. A method according to claim 1 in which the dough is essentially free of sodium bicarbonate.

15. In a method for the production of a low sodium sponge cracker comprising:
(a) preparing a sponge, by a process comprising mixing sponge ingredients comprising flour, water and yeast and fermenting the mixture;
(b) forming a dough by a process comprising admixing dough ingredients comprising flour, potassium carbonate, and at least one of water and shortening with said sponge, thereby forming a dough;
(c) laminating the dough; and
(d) baking the laminated dough; the improvement comprising replacing at least a portion of said potassium carbonate with a mixture of potassium carbonate and potassium bicarbonate, the molar ration of potassium carbonate to potassium bicarbonate being in the range of from about 85:15 to about 50:50 whereby the lay time of said dough is extended, and wherein substantially all of the sodium of the laminated sponge cracker is contributed by sodium chloride and said sponge cracker has a sodium content not greater than 130 mg. of sodium ion per 14.2 g serving.

16. A method according to claim 15 wherein at least one of the potassium carbonate and potassium carbonate is added as an aqueous solution.

17. A method according to claim 15 wherein all of the potassium carbonate is replaced with potassium carbonate and potassium bicarbonate.

18. A method according to claim 15 wherein the molar ratio of potassium carbonate to potassium bicarbonate is in the range of from about 85:15 to about 65:35.

19. A method according to claim 15 wherein the cracker comprises at least about 30 mg. of sodium in the form of sodium chloride in the dough, and at least about 60 mg. of sodium in the form of sodium chloride in the topping, per 14.2 g. serving of the baked cracker.

20. The method of claim 15 wherein said dough has a lay time of from about 5 to 7 hours.

21. A dough composition for producing a cracker, the dough composition comprising flour, water, fat or shortening, potassium carbonate and potassium bicarbonate, the molar ratio of potassium carbonate to potassium bicarbonate in said dough composition being in the range of from about 85:15 to about 50:50 whereby the dough composition has a lay time of up to about 7 hours and is capable of producing a baked cracker having a pH of from about 6.7 to about 8.0.

22. A dough composition according to claim 21 wherein the molar ratio of potassium carbonate to potassium bicarbonate is in the range of from about 85:15 to about 65:35.

23. A dough composition according to claim 22 wherein the total weight of potassium carbonate and potassium bicarbonate added is from about 0.5 to about 3 parts per 100 parts by weight of flour in the dough composition.

24. A dough composition according to claim 22 which is essentially free from sodium bicarbonate.

* * * * *